US010526999B2

(12) United States Patent
Okino

(10) Patent No.: US 10,526,999 B2
(45) Date of Patent: Jan. 7, 2020

(54) ENGINE

(71) Applicant: SUBARU CORPORATION, Tokyo (JP)

(72) Inventor: Shunsuke Okino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/172,441

(22) Filed: Oct. 26, 2018

(65) Prior Publication Data

US 2019/0211773 A1     Jul. 11, 2019

(30) Foreign Application Priority Data

Jan. 5, 2018 (JP) .................................. 2018-000632

(51) Int. Cl.
| | |
|---|---|
| *F02B 1/04* | (2006.01) |
| *F02F 1/42* | (2006.01) |
| *F02M 35/10* | (2006.01) |
| *F02M 35/104* | (2006.01) |

(52) U.S. Cl.
CPC .............. *F02F 1/4214* (2013.01); *F02B 1/04* (2013.01); *F02M 35/1045* (2013.01); *F02M 35/10262* (2013.01); *F02M 35/10255* (2013.01)

(58) Field of Classification Search
CPC ......... F02M 35/10255; F02M 35/1045; F02M 35/10262; F02B 1/04; F02F 1/4214
See application file for complete search history.

(56) References Cited

U.S. PATENT DOCUMENTS

| | | | | |
|---|---|---|---|---|
| 7,032,560 | B2 * | 4/2006 | Katou ..................... | F02B 31/08 123/193.5 |
| 7,198,026 | B2 * | 4/2007 | Masuta ..................... | B22C 9/10 123/302 |
| 2002/0078921 | A1 * | 6/2002 | Kim ........................ | F02B 31/06 123/306 |
| 2004/0226536 | A1 * | 11/2004 | Sakai ..................... | F02B 23/08 123/308 |

FOREIGN PATENT DOCUMENTS

| | | |
|---|---|---|
| CN | 205618272 U | 10/2016 |
| DE | 10 2010 007 065 A1 | 8/2011 |
| JP | H06-159079 A | 6/1994 |
| JP | H06-159203 A | 6/1994 |

(Continued)

OTHER PUBLICATIONS

Japanese Office Action, dated Jul. 9, 2019, in Japanese Application No. 2018-000632 and English Translation thereof.

*Primary Examiner* — Kevin A Lathers
(74) *Attorney, Agent, or Firm* — McGinn IP Law Group, PLLC

(57) ABSTRACT

An engine provided with a combustion chamber includes a cylinder head in which a bulkhead is provided so as to extend toward the combustion chamber and an intake port is formed so as to bifurcate at the bulkhead, a bulkhead member that is provided with a partition plate intersecting the bulkhead and that divides the intake port into a first flow passage and a second flow passage with the partition plate provided between the first and second flow passages. The bulkhead of the cylinder head has a cutout formed and the partition plate of the bulkhead plate has an auxiliary wall that fills the cutout.

8 Claims, 11 Drawing Sheets

(56) References Cited

FOREIGN PATENT DOCUMENTS

| | | |
|---|---|---|
| JP | 2008-144740 A | 6/2008 |
| JP | 2015-169096 A | 9/2015 |
| JP | 2016-191318 A | 11/2016 |
| JP | 2017-002758 A | 1/2017 |
| KR | 10-1459932 B1 | 11/2014 |

* cited by examiner

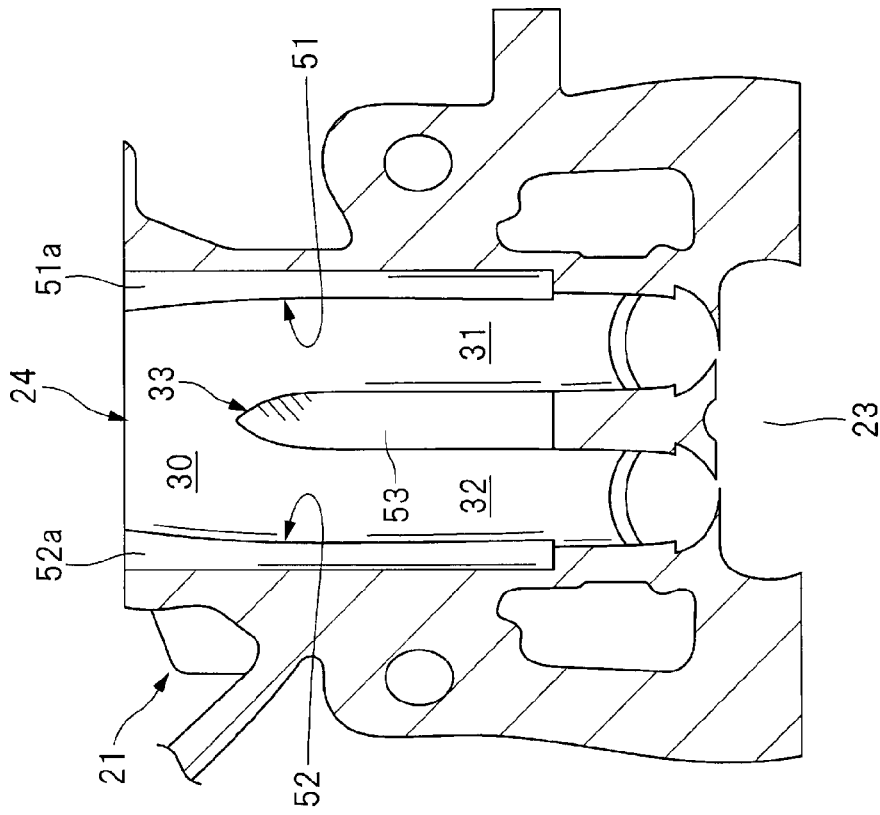
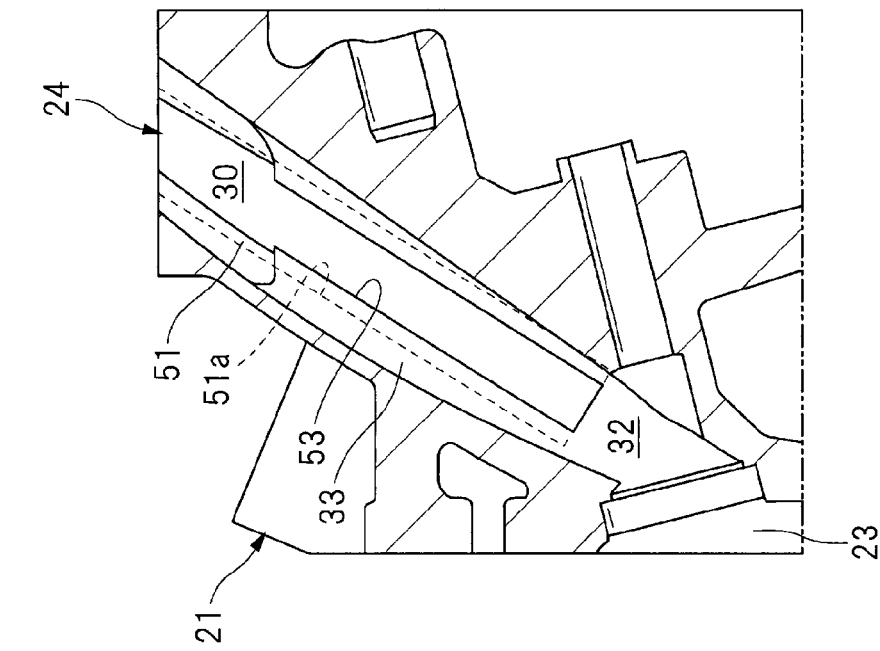

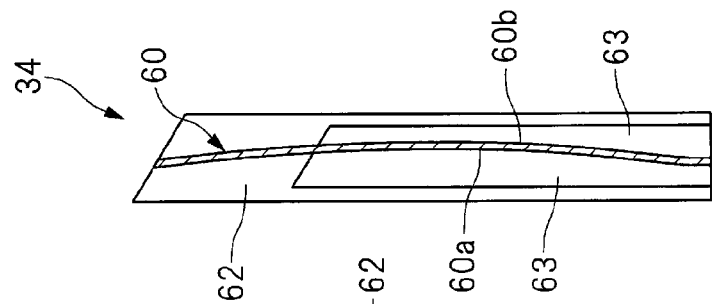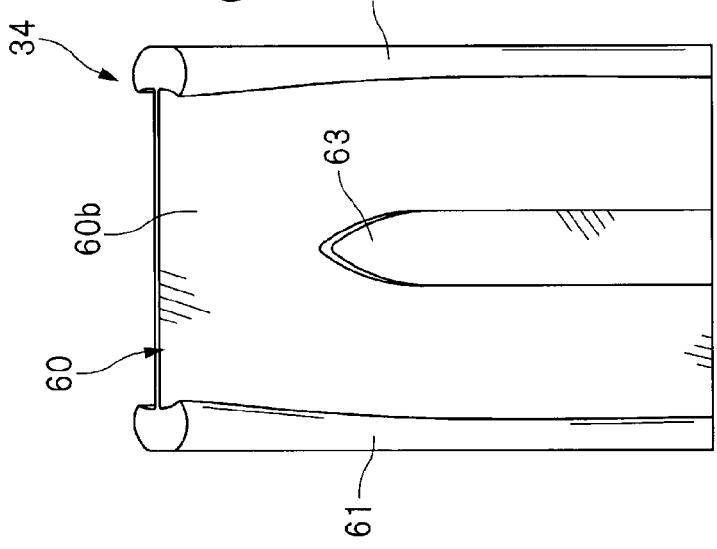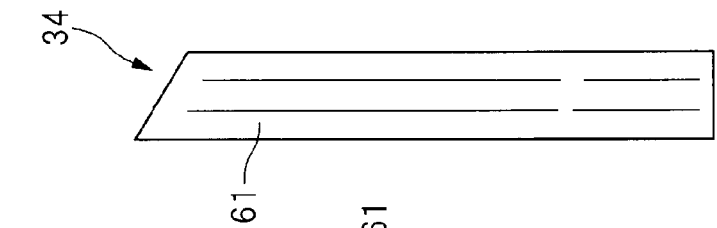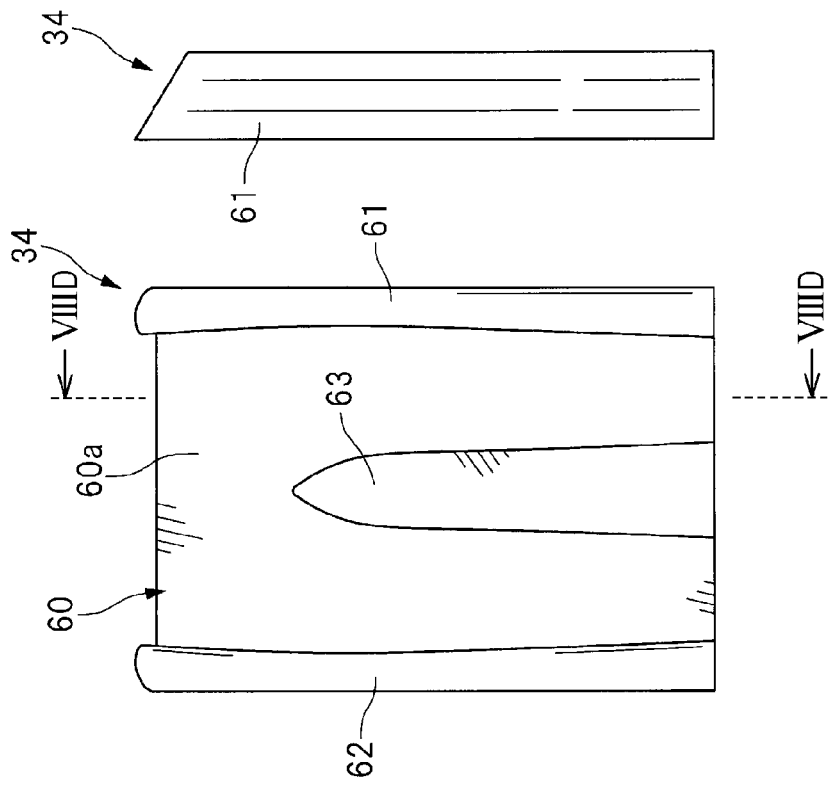

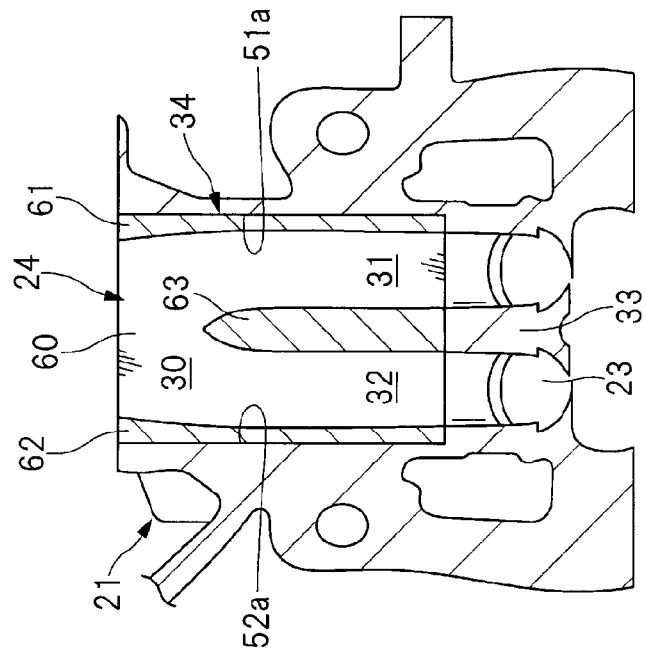
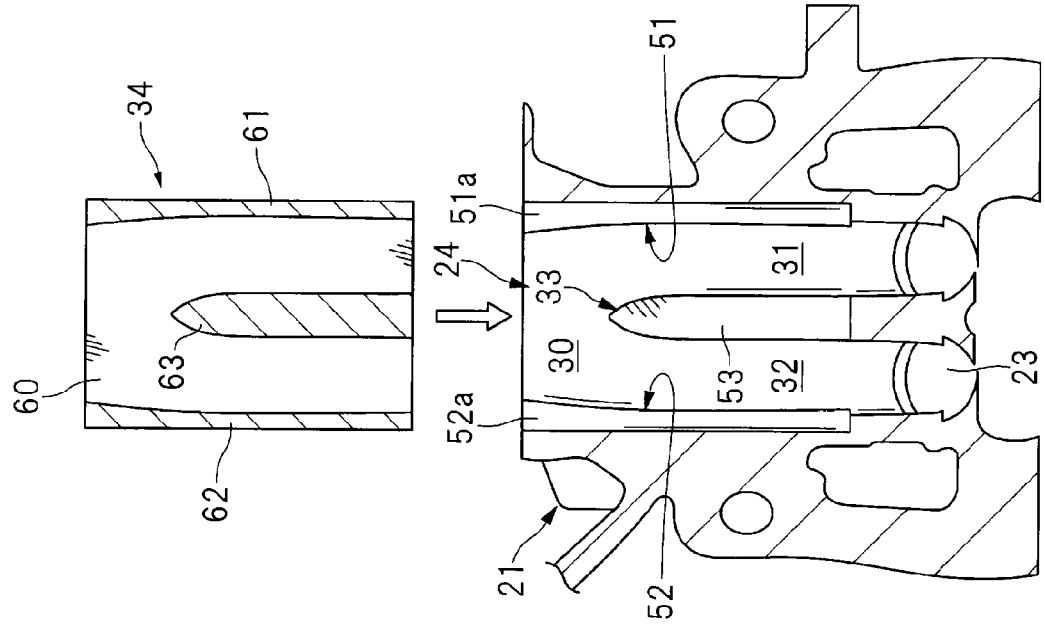

ENGINE

CROSS-REFERENCE TO RELATED APPLICATIONS

The present application claims priority from Japanese Patent Application No. 2018-000632 filed on Jan. 5, 2018, the entire contents of which are hereby incorporated by reference.

BACKGROUND

1. Technical Field

The present invention relates to an engine provided with an intake port.

2. Related Art

A cylinder head of an engine has an intake port that guides air into a combustion chamber. There has been proposed an engine in which such an intake port is divided by a plate member in such a manner as to concentrate an intake air flow on a specific region of the combustion chamber and thereby create a strong tumble flow in the combustion chamber (see Japanese Unexamined Patent Application Publication No. 2016-191318).

SUMMARY OF THE INVENTION

An aspect of the present invention provides an engine provided including a combustion chamber, a cylinder head, and a plate member. In the cylinder head a bulkhead is provided so as to extend toward the combustion chamber and an intake port is formed so as to bifurcate at the bulkhead. The plate member that is provided with a partition plate intersecting the bulkhead and that divides the intake port into a first flow passage and a second flow passage. The partition plate is provided between the first and second flow passages. A cutout is formed in the bulkhead of the cylinder head and an auxiliary wall is provided in the partition plate of the plate member in such a manner as to fill the cutout.

BRIEF DESCRIPTION OF THE DRAWINGS

FIGS. 5A and 5B are cross-sectional views exemplifying a cylinder head with no bulkhead plate installed;

FIG. 8A is a plan view of a bulkhead plate; FIG. 8B is a side view of a bulkhead plate; FIG. 8C is a bottom view of a bulkhead plate; FIG. 8D is a cross-sectional view taken along line VIIID-VIIID of FIG. 8A;

FIGS. 10A and 10B are diagrams illustrating a process in which a bulkhead plate is installed to a cylinder head.

DETAILED DESCRIPTION

Figure 1:
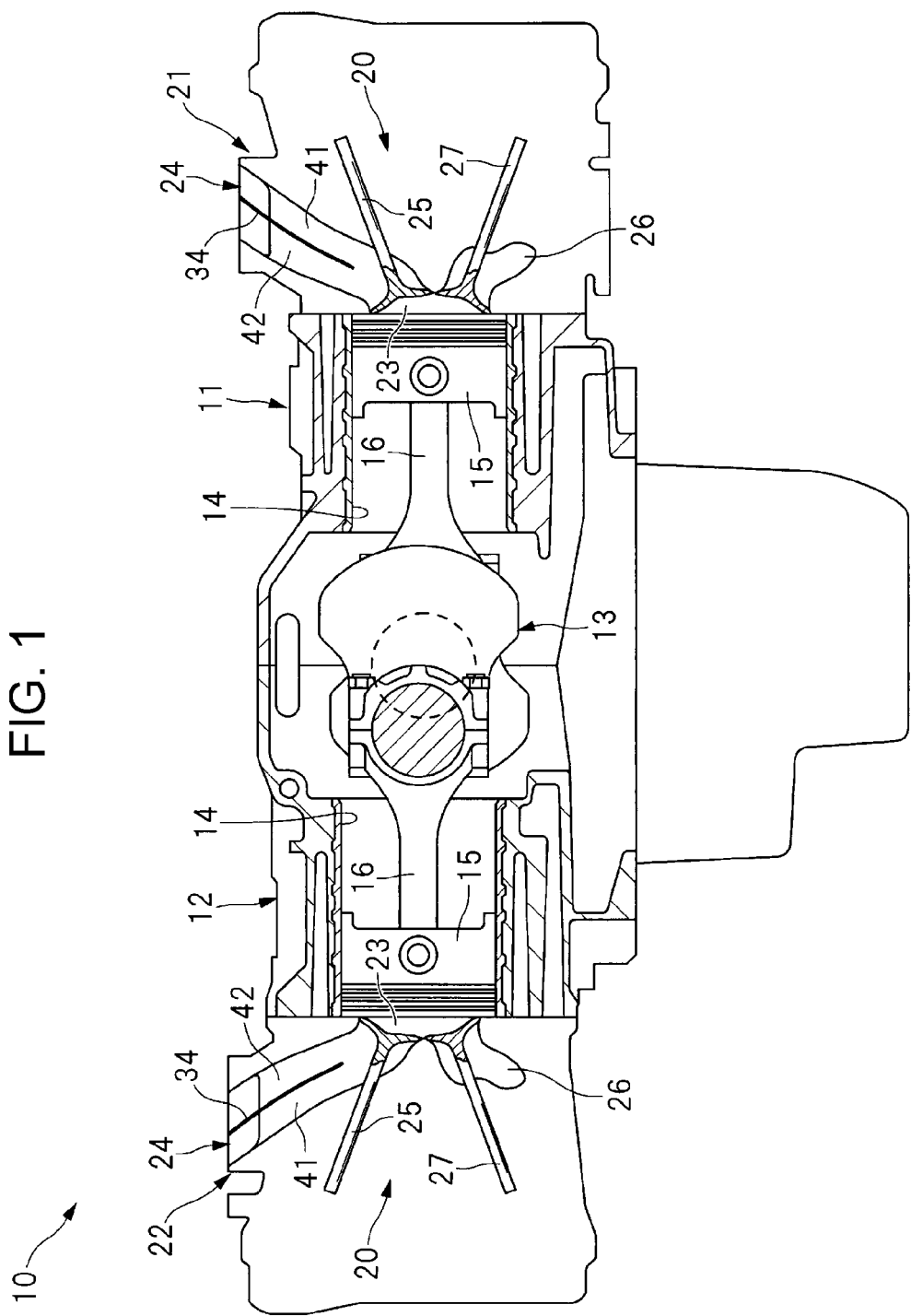
FIG. 1 is a schematic view of an engine according to an example of the present invention.

Hereinafter, an example of the present invention will be described with reference to the drawings. Note that the following description is directed to an illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Strengthening the flow of intake air into a combustion chamber requires a plate member to be extended close to the combustion chamber. To achieve this, it is conceivable that the plate member be bifurcated to meet the shape of an intake port and that the plate member be inserted into the intake port. The insertion of the bifurcated plate member into the intake port requires a clearance to be provided between the intake port and the plate member. However, such a clearance provided between the intake port and the plate member may cause the intake air to leak from a flow passage divided by the plate member to another flow passage, which may raise a concern about weakened intake air flow.

It is desirable to enhance the intake air flow.

[Engine Structure]

FIG. 1 is a schematic view of an engine 10 according to an example of the present invention. As illustrated in FIG. 1, the engine 10 includes a cylinder block 11 provided on one of two cylinder banks, a cylinder block 12 provided on the other of the cylinder banks, and a crank shaft 13 supported on a pair of the cylinder blocks 11, 12. Cylinder bores 14 formed in the cylinder blocks 11, 12 have pistons 15 housed therein, the pistons 15 being connected to the crank shaft 13 with connecting rods 16 therebetween.

Cylinder heads 21, 22 provided with valve trains 20 are mounted on the cylinder blocks 11, 12. The cylinder heads 21, 22 have intake ports 24 that are in communication with combustion chambers 23 and intake valves 25 that open and close the intake ports 24. In addition, the cylinder heads 21, 22 have exhaust ports 26 that are in communication with the combustion chambers 23 and exhaust valves 27 that open and close the exhaust ports 26. The intake ports 24 are connected to valve units 43 and intake manifolds 44 to be described later, and the exhaust ports 26 are connected to exhaust manifolds (not illustrated).

[Intake Air Flow]

Figure 2:
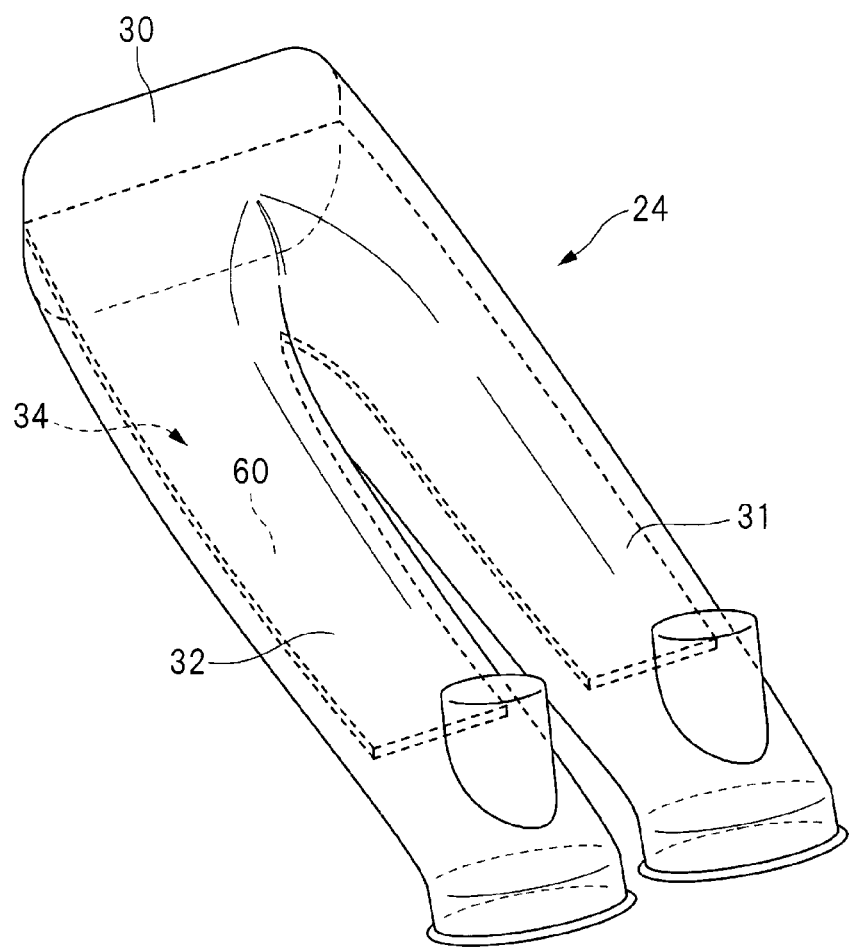
FIG. 2 is a perspective view exemplifying an intake port.
Figure 3:
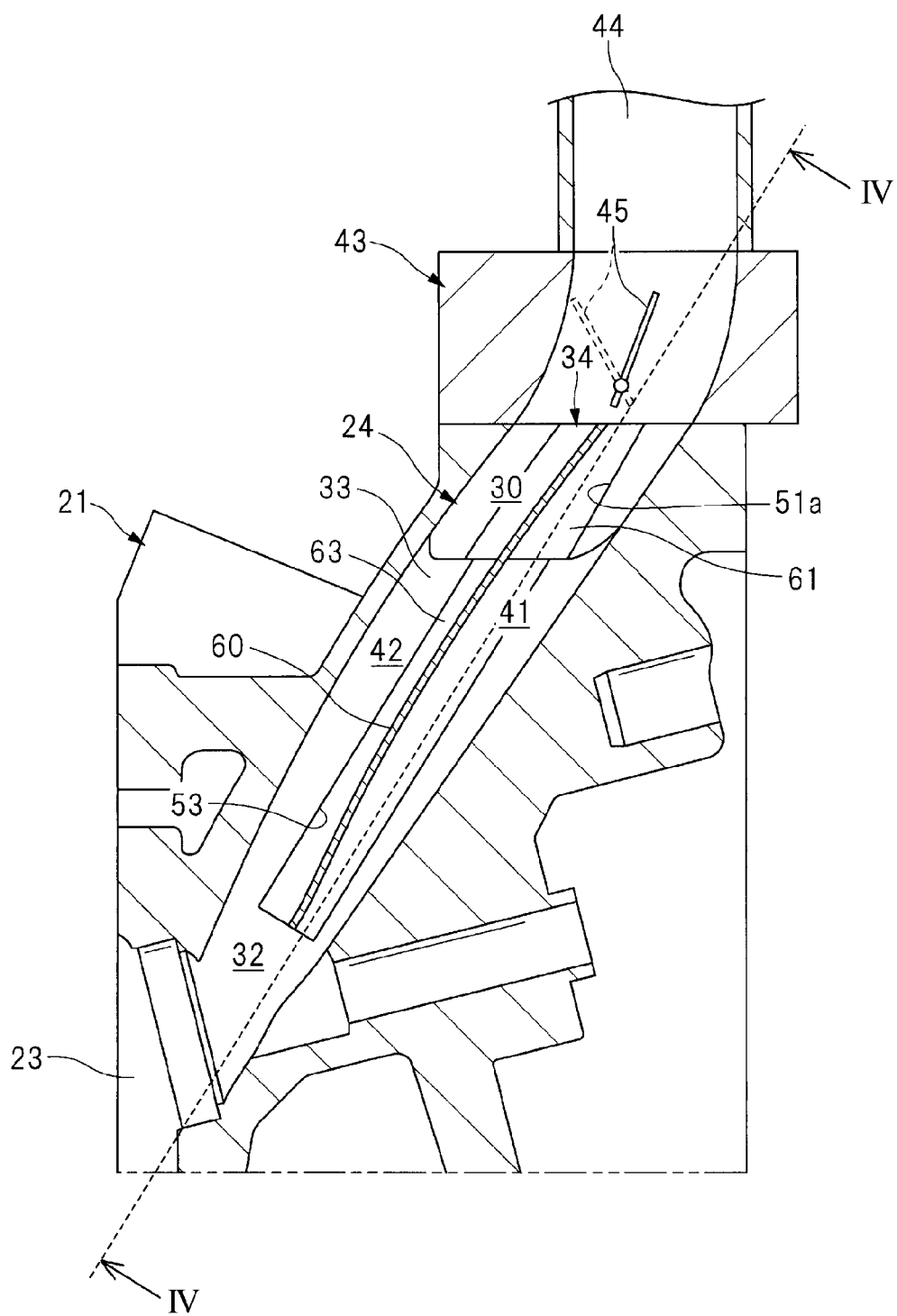
FIG. 3 is a cross-sectional view exemplifying an intake port and a valve unit connected to the intake port.
Figure 4:
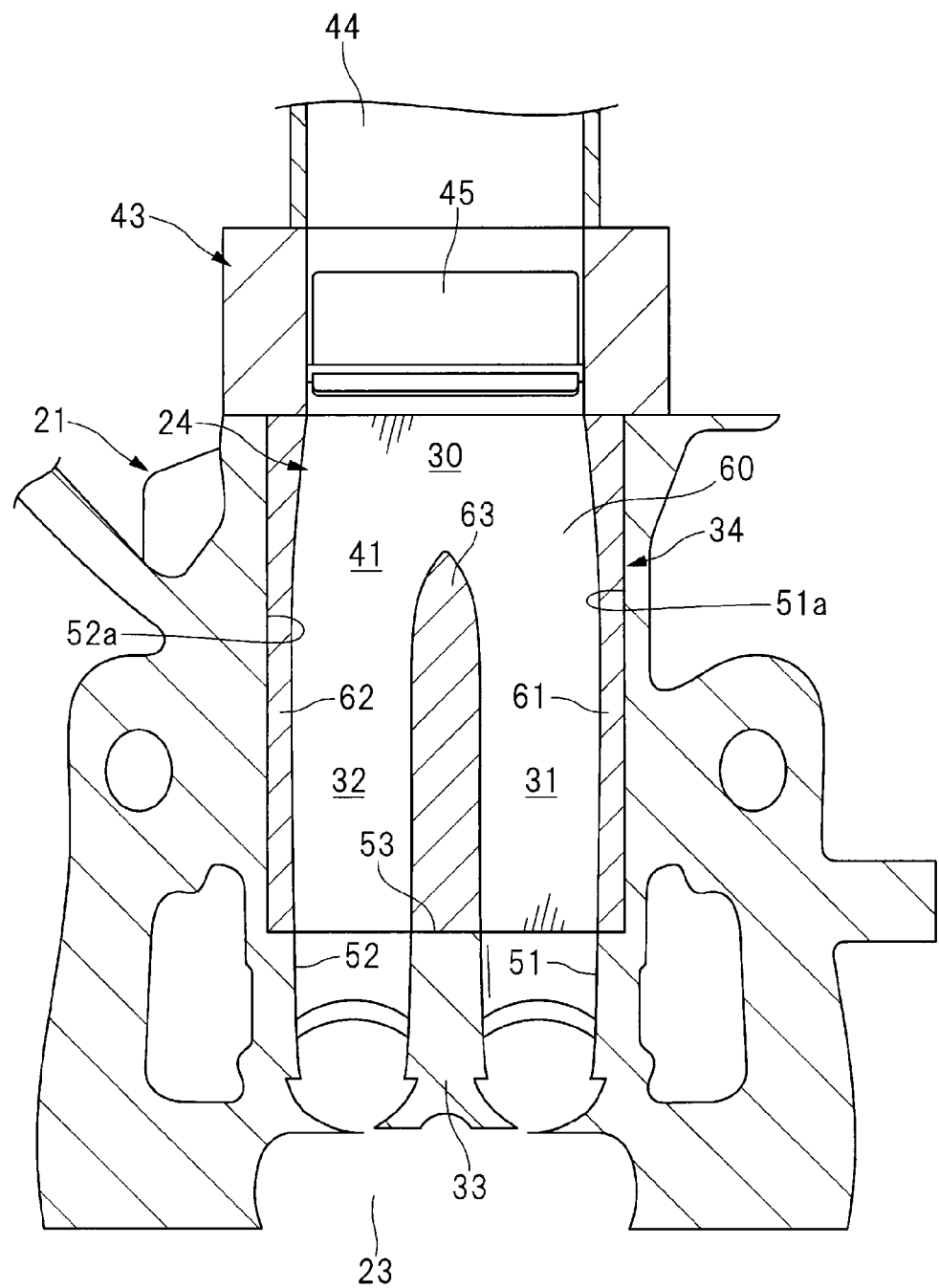
FIG. 4 is a cross-sectional view taken along line IV-IV of FIG. 3.

A flow of intake air passing through the intake ports 24 is described below. FIG. 2 is a perspective view exemplifying the intake ports 24. FIG. 3 is a cross-sectional view exemplifying the intake ports 24 and the valve units 43 connected to the intake ports 24. FIG. 4 is a cross-sectional view taken along line IV-IV of FIG. 3. The intake ports 24 formed in one of the cylinder heads 21, 22 have the same structure as the intake ports 24 formed in the other of the cylinder heads 21, 22. Note that FIG. 2 omits illustrations of engaging members 61, 62 and an auxiliary wall 63 of a bulkhead plate 34 to be described later.

As illustrated in FIGS. 2 through 4, each of the intake ports 24 includes a common port 30 disposed on the upstream side, a first port 31 that is branched from the common port 30 and that is opened to the combustion chamber 23, and a second port 32 that is branched from the common port 30 and that is opened to the combustion chamber 23. In other words, as illustrated in FIG. 4, a bulkhead 33 is provided in the cylinder head 21 so as to extend toward the combustion chamber 23 and divides the intake port 24 into the first port 31 and the second port 32. In addition, as illustrated in FIGS. 2 through 4, a bulkhead plate 34 (plate member) is provided in the intake port 24 of the cylinder head 21 to define flow passages in the intake port 24. As illustrated in FIG. 3, a first flow passage 41 is defined on one side of the bulkhead plate 34, while a second flow passage 42 is defined on the other side of the bulkhead plate 34.

As illustrated in FIGS. 3 and 4, the common port 30 of the intake port 24 is connected to the intake manifold 44 with the valve unit 43 therebetween. As illustrated in FIG. 3, the valve unit 43 is provided with a tumble valve 45 that is switchable between an open position indicated by solid lines and a closed position indicated by dashed lines. When the tumble valve 45 is put in the open position, the intake air flowing into the intake port 24 through the intake manifold 44 is distributed to the combustion chamber 23 through both the first flow passage 41 and the second flow passage 42 of the intake port 24. On the other hand, when the tumble valve 45 is put in the closed position, the intake air flowing into the intake port 24 through the intake manifold 44 is distributed to the combustion chamber 23 through the first flow passage 41 of the intake port 24.

In other words, putting the tumble valve 45 in the closed position enables the intake air coming into the intake port 24 to flow through one of the two passages in the intake port 24, thereby strengthening the tumble flow (longitudinal vortex flow) of the intake air to be distributed to the combustion chamber 23. The strengthened tumble flow of the intake air distributed to the combustion chamber 23 improves the combustion of an air-fuel mixture in the combustion chamber 23. Although the second flow passage 42 of the intake port 24 closed by the tumble valve 45 is illustrated in the figure, the first flow passage 41 of the intake port 24 may be closed by the tumble valve 45 from the viewpoint of improving the tumble flow of the intake air to be distributed to the combustion chamber 23, depending on the shape of the intake port 24, the shape of the combustion chamber 23, or the shape of the pistons 15.

[Cylinder Head Structure]

Figure 6:
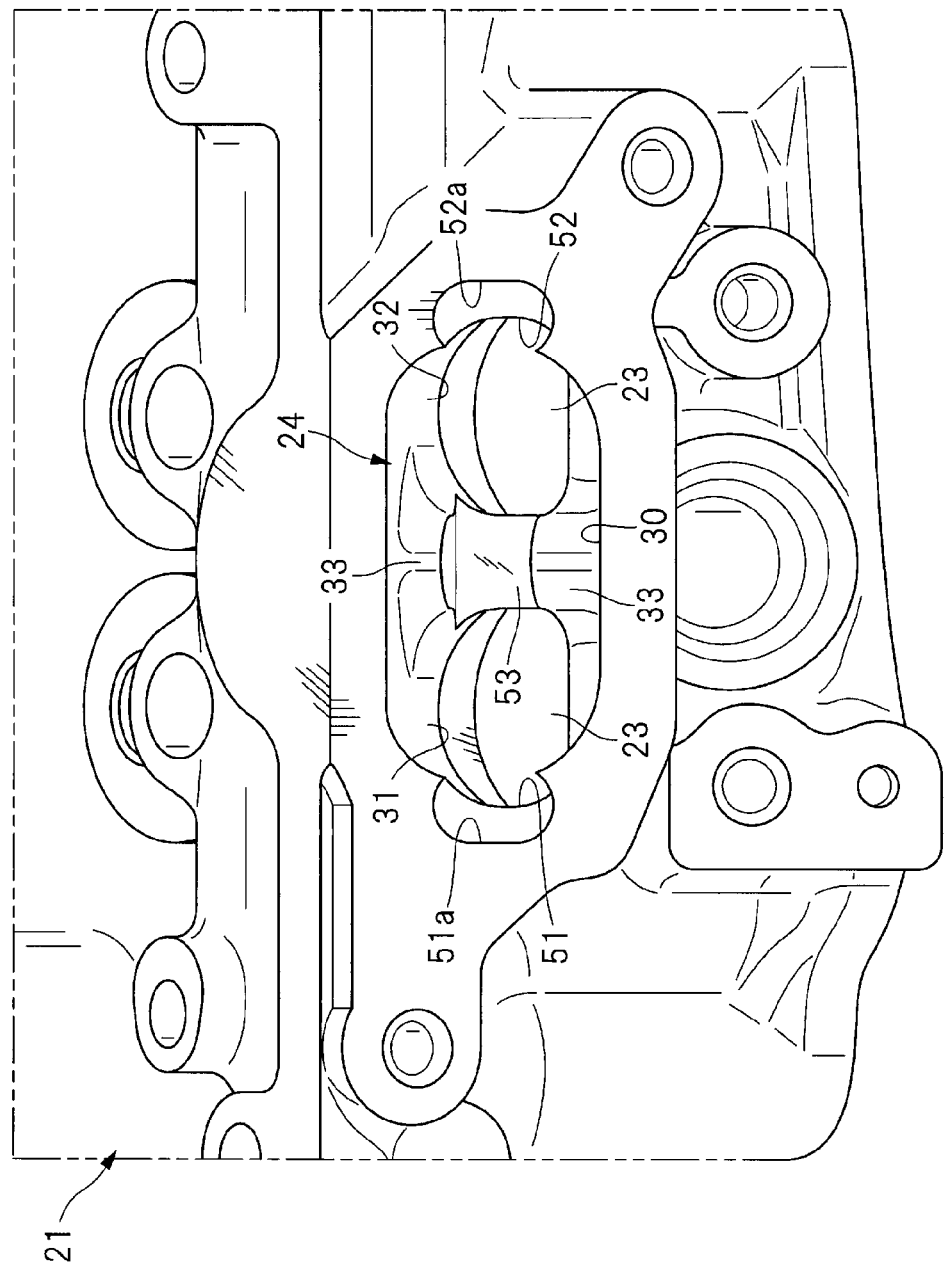
FIG. 6 is a perspective view exemplifying a cylinder head with no bulkhead plate installed.

The cylinder head 21 in which the intake port 24 is formed will be described below with regard to the structure. FIGS. 5A and 5B are cross-sectional views exemplifying the cylinder head 21 with the bulkhead plate 34 not installed. The region illustrated in the cross-sectional view of FIG. 5A is the same as the region illustrated in the cross-sectional view of FIG. 3, while the region illustrated in the cross-sectional view of FIG. 5B is the same as the region illustrated in the cross-sectional view of FIG. 4. FIG. 6 is a perspective view exemplifying the cylinder head 21 with the bulkhead plate 34 not installed.

As illustrated in FIGS. 5A, 5B, and 6, the cylinder head 21 includes the bulkhead 33 provided between the first port 31 and the second port 32, a first port inner wall 51 that forms an inner wall of the first port 31 in such a manner as to face the bulkhead 33, and a second port inner wall 52 that forms an inner wall of the second port 52 in such a manner as to face the bulkhead 33. In addition, the bulkhead 33 has an elongated cutout 53 formed therealong substantially at its vertical center, the cutout 53 extending linearly toward the combustion chamber 23. Furthermore, the first port inner wall 51 has a linearly extending first engaging groove (groove) 51a, while the second port inner wall 52 has a linearly extending second engaging groove (groove) 52a.

[Bulkhead Structure]

Figure 7:
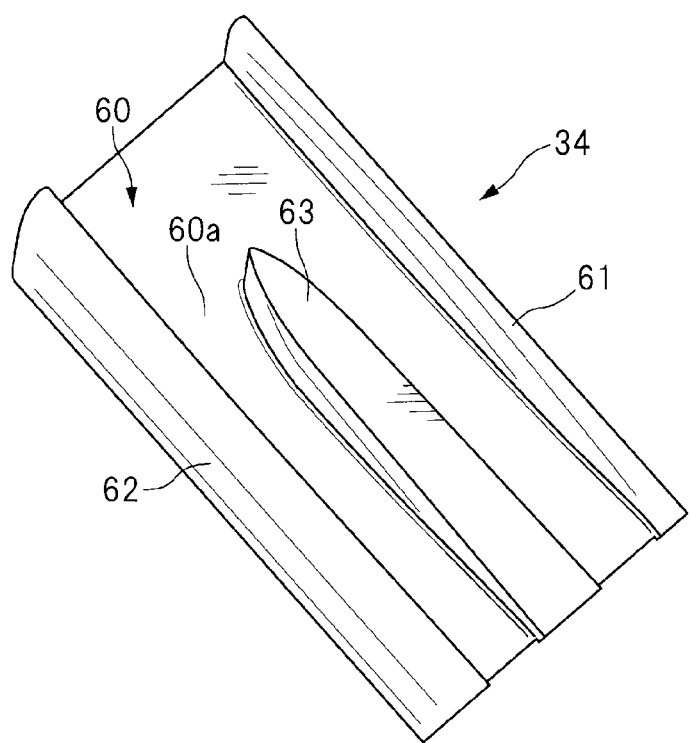
FIG. 7 is a perspective view exemplifying a bulkhead plate.

The bulkhead plate 34 installed in the cylinder head 21 will be described below. FIG. 7 is a perspective view exemplifying the bulkhead plate 34. FIG. 8A is a plan view of the bulkhead plate 34. FIG. 8B is a side view of the bulkhead plate 34. FIG. 8C is a bottom view of the bulkhead plate 34. FIG. 8D is a cross-sectional view taken along line VIIID-VIIID of FIG. 8A.

As illustrated in FIGS. 7, 8A, 8B, 8C, and 8D, the bulkhead plate 34 includes a substantially rectangular-shaped partition plate 60, a first engaging member 61 provided at one crosswise end of the partition plate 60, a second engaging member 62 provided at the other crosswise end of the partition plate 60, and an auxiliary wall 63 provided at the crosswise center of the partition plate 60. As illustrated in FIG. 8D, the auxiliary wall 63 projects from both sides of the partition plate 60. Specifically, the auxiliary wall 63 projects from one side 60a of the partition plate 60 and also projects from the other side 60b of the partition plate 60. In addition, as illustrated in FIG. 8D, the first engaging member 61, the second engaging member 62, and the auxiliary wall 63 are formed so as to extend linearly in the lengthwise direction. The bulkhead plate 34 consisting of the partition plate 60, the first engaging member 61, the second engaging member 62, and the auxiliary wall 63 may be formed of resin or metallic materials in such a manner as to be permanently attached to one another.

[Cylinder Head and Bulkhead Plate]

Figure 9B:
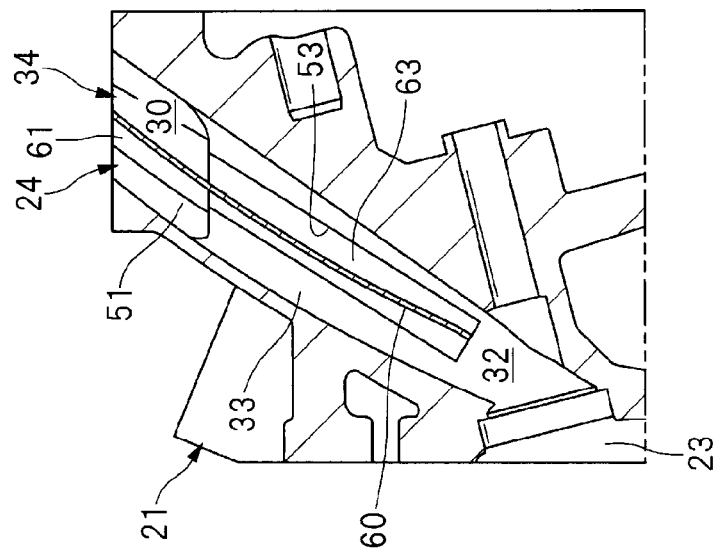
FIGS. 9A and 9B are diagrams illustrating a process in which a bulkhead plate is installed to a cylinder head.
Figure 9A:
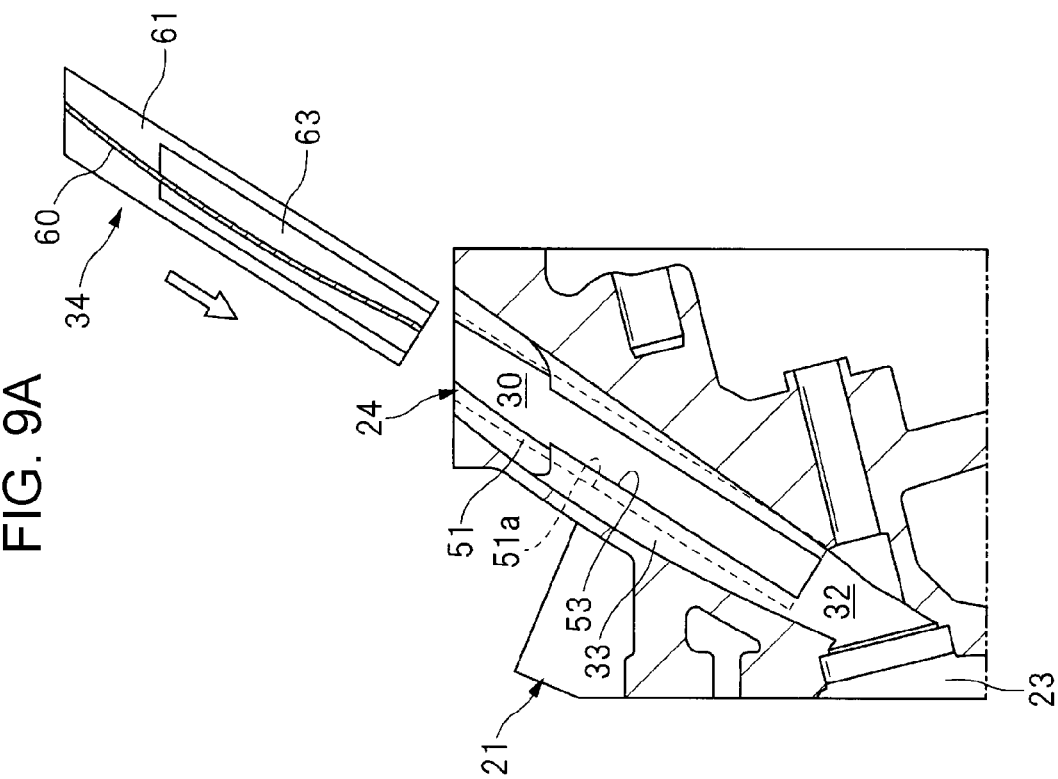
Figure 11:
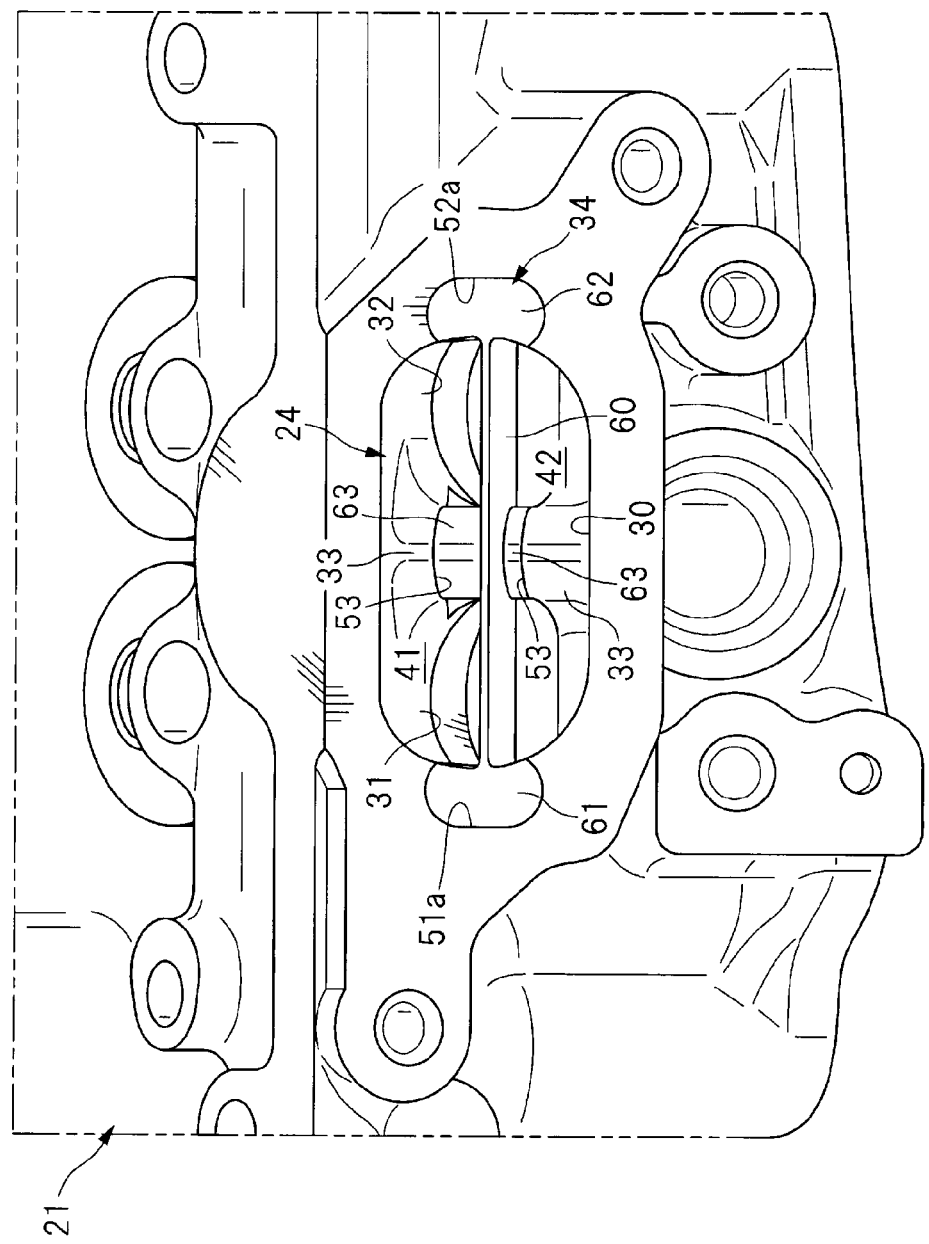
FIG. 11 is a perspective view of a cylinder head with a bulkhead plate installed.

FIGS. 9A, 9B, 10A, and 10B are cross-sectional views illustrating a process in which the bulkhead plate 34 is installed onto the cylinder head 21. The region illustrated in the cross-sectional view of FIGS. 9A and 10A is the same as the region illustrated in the cross-sectional view of FIG. 3, while the region illustrated in the cross-sectional view of FIGS. 9B and 10B is the same as the region illustrated in the cross-sectional view of FIG. 4. FIG. 11 is a perspective view illustrating the cylinder head 21 with the bulkhead plate 34 installed.

As illustrated in FIGS. 9A and 10A, when the bulkhead plate 34 is mounted onto the cylinder head 21, the first and second engaging members 61, 62 of the bulkhead plate 34 are inserted into the first and second engaging grooves 51a, 52a of the cylinder head 21. Specifically, as illustrated in FIGS. 9B and 10B, the bulkhead plate 34 is inserted into the cylinder head 21 until ends of the engaging members 61, 62 and the auxiliary wall 63 provided in the bulkhead plate 34 come into contact with ends of engaging grooves 51a, 52a and the cutout 53 provided in the cylinder head 21. As illustrated in FIG. 11, through the process of inserting the bulkhead plate 34, the bulkhead plate 34 provided with the partition plate 60 intersecting the bulkhead 33 is mounted onto the intake port 24 of the cylinder head 21. With this arrangement, the intake port 24 of the cylinder head 21 is divided into the first flow passage 41 and the second flow passage 42, both of which have the partition plate 60 of the bulkhead plate 34 therebetween.

As illustrated in FIG. 11, the auxiliary wall 63 of the bulkhead plate 34 is fit into the cutout 53 of the bulkhead 33 of the cylinder head 21. In other words, the cutout 53 of the bulkhead 33 of the cylinder head 21 is filled up with the auxiliary wall 63 of the bulkhead plate 34. This arrangement causes the auxiliary wall 63 of the bulkhead plate 34 to function as part of the bulkhead 33 of the cylinder head 21, thereby enabling the bulkhead plate 34 to be laid across a region between the first port 31 and the second port 32.

As described above, even when the tumble valve 45 is closed to guide more intake air into the first flow passage 41, use of the bulkhead plate 34 that is installed across the bulkhead 33 of the cylinder head 21 eliminates the leakage of the intake air from the first flow passage 41 to the second flow passage 42, thereby strengthening the flow of the intake air before distribution of the intake air to the combustion chamber 23. Specifically, use of a bifurcated bulkhead plate that is installed so as to avoid the bulkhead 33 of the cylinder head 21 requires a clearance to be provided between the bulkhead 33 and the bulkhead plate, which may cause the intake air to leak from the first flow passage 41 to the second flow passage 42, posing a problem of weakened intake air flow. Use of the bulkhead plate 34 can solve this problem.

In addition, as described later, the auxiliary wall 63 provided on the partition plate 60 of the bulkhead plate 34 helps prevent vibrations of the partition plate 60 even if the partition plate 60 is extended toward the combustion chamber 23. As illustrated in FIGS. 3 and 4, the partition plate 60 of the bulkhead plate 34 is disposed in a space consisting of the common port 30, the first port 31, and the second port 32. Specifically, the partition plate 60 of the bulkhead plate 34 divides the space of the common port 30, the first port 31, and the second port 32 into the first flow passage 41 and the second flow passage 42. As described above, the extension of the partition plate 60 deep into the first port 31 and the second port 32 enables the first flow passage 41 and the second flow passage 42 to extend close to the combustion chamber 23, thereby distributing a strengthened intake air flow to the combustion chamber 23.

As described above, although the extension of the partition plate 60 of the bulkhead plate 34 toward the combustion chamber 23 poses a problem of the partition plate 60 having a tendency to vibrate, the auxiliary wall 63 provided on the partition plate 60 is supported on the bulkhead 33 of the cylinder head 21, which ensures that the end of the auxiliary wall 63 is also supported on the side of the combustion chamber 23. This arrangement enables the extension of the partition plate 60 toward the combustion chamber 23 while suppressing the vibrations of the partition plate 60, thereby distributing the strengthened intake air flow to the combustion chamber 23.

The present invention is typically described with regard to the foregoing preferred example, but is not limited to this example. Needless to say, various modifications are conceivable within the scope of the present invention. Although the present invention is applied to the horizontally opposed engine 10 in the above description, the application is not limited to this. The present invention may be applied to an inline engine or a V-type engine. In addition, although the valve unit 43 is coupled to the intake port 24 in the above description, the present invention may be applied to an engine having no valve unit 43. In addition, although FIG. 8D illustrates the auxiliary wall 63 projecting from both sides of the partition plate 60, the auxiliary wall 63 may project from any one side of the partition plate 60. Furthermore, although FIG. 8D illustrates the partition plate 60 curving in the longitudinal direction from the viewpoint of matching the shape of the intake port 24, the partition plate 60 may extend straight in the longitudinal direction.

According to the present invention, a cutout is formed in a bulkhead of a cylinder head, and an auxiliary wall is provided in a partition plate of a plate member so as to fill the cutout. This arrangement can suppress intake air from leaking and strengthen the intake air flow.

The invention claimed is:

1. An engine comprising:
   a combustion chamber;
   a cylinder head in which a bulkhead is provided so as to extend toward the combustion chamber and an intake port is formed so as to bifurcate at the bulkhead; and
   a plate member that is provided with a partition plate intersecting the bulkhead and that divides the intake port into a first flow passage and a second flow passage, the partition plate being provided between the first and second flow passages,
   wherein a cutout is formed in the bulkhead of the cylinder head and an auxiliary wall is provided in the partition plate of the plate member in such a manner as to fill the cutout.

2. The engine according to claim 1,
   wherein the auxiliary wall projects from both sides of the partition plate.

3. The engine according to claim 2,
   wherein the intake port bifurcates at the bulkhead into a first port and a second port;
   wherein the cylinder head comprises a first port inner wall that constitutes an inner wall of the first port in such a manner as to face the bulkhead and a second port inner wall that constitutes an inner wall of the second port in such a manner as to face the bulkhead; and
   wherein the plate member comprises a first engaging member that engages a groove formed in the first port inner wall and a second engaging member that engages a groove formed in the second port inner wall.

4. The engine according to claim 3, wherein the intake port comprises a common port provided on an upstream side, a first port, and a second port, the first and second ports being bifurcated from the common port; and wherein the partition plate divides a space of the common port, the first port, and the second port into the first flow passage and the second flow passage.

5. The engine according to claim 2, wherein the intake port comprises a common port provided on an upstream side, a first port, and a second port, the first and second ports being bifurcated from the common port; and wherein the partition plate divides a space of the common port, the first port, and the second port into the first flow passage and the second flow passage.

6. The engine according to claim 1,
   wherein the intake port bifurcates at the bulkhead into a first port and a second port;
   wherein the cylinder head comprises a first port inner wall that constitutes an inner wall of the first port in such a manner as to face the bulkhead and a second port inner wall that constitutes an inner wall of the second port in such a manner as to face the bulkhead; and
   wherein the plate member comprises a first engaging member that engages a groove formed in the first port inner wall and a second engaging member that engages a groove formed in the second port inner wall.

7. The engine according to claim 6, wherein the intake port comprises a common port provided on an upstream side, a first port, and a second port, the first and second ports being bifurcated from the common port; and wherein the partition plate divides a space of the common port, the first port, and the second port into the first flow passage and the second flow passage.

8. The engine according to claim 1, wherein the intake port comprises a common port provided on an upstream side, a first port, and a second port, the first and second ports being bifurcated from the common port; and wherein the partition plate divides a space of the common port, the first port, and the second port into the first flow passage and the second flow passage.

\* \* \* \* \*